Feb. 1, 1944.  W. C. WAGNER  2,340,781
MAGNETIC BEARING
Filed Oct. 28, 1940
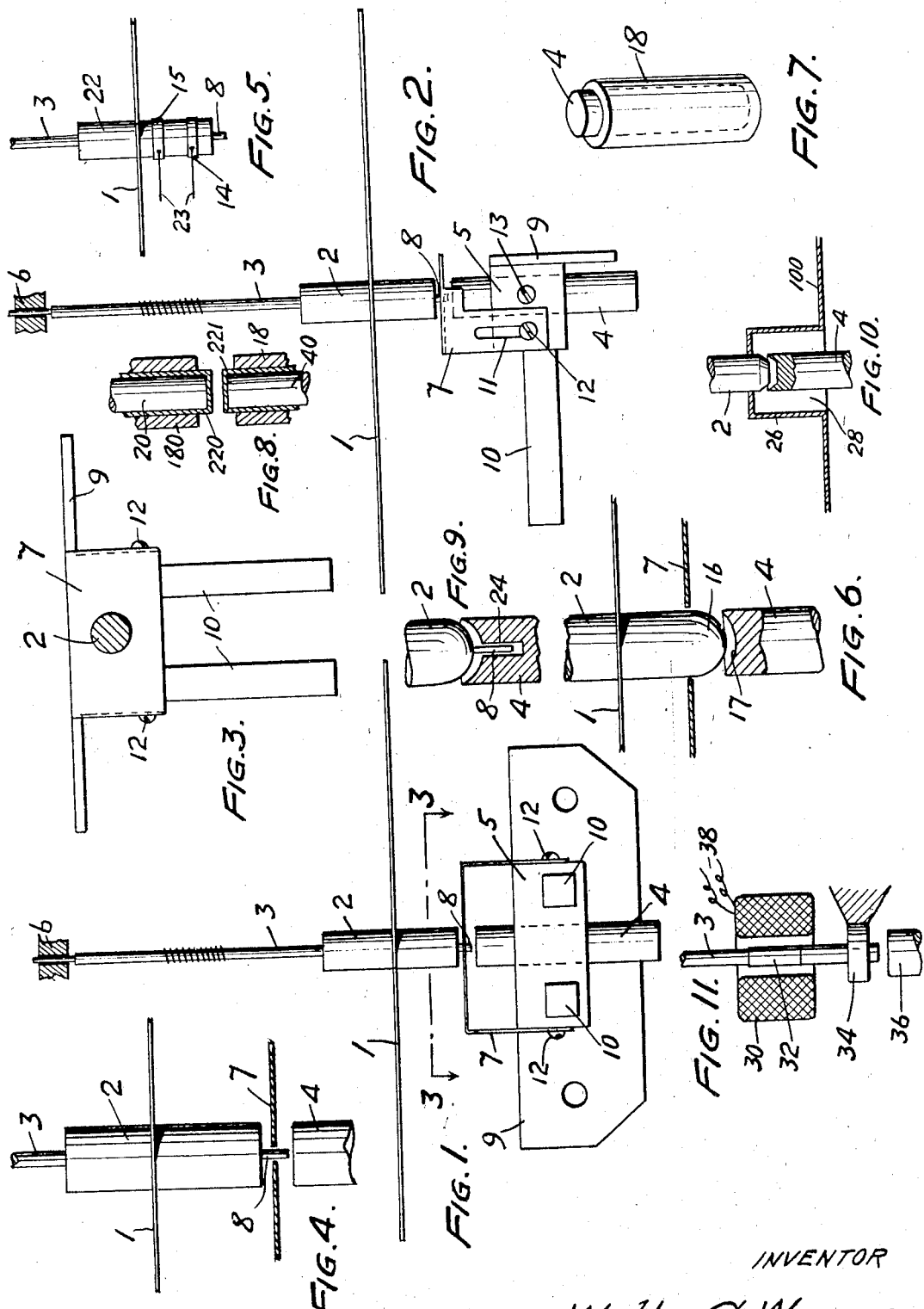
INVENTOR
Walter C. Wagner
BY
Augustus B. Stoughton
ATTORNEY.
WITNESS:

Patented Feb. 1, 1944

2,340,781

UNITED STATES PATENT OFFICE 2,340,781

MAGNETIC BEARING

Walter C. Wagner, Ardmore, Pa.

Application October 28, 1940, Serial No. 363,108

3 Claims. (Cl. 308—1)

At present the moving elements of sensitive pivoted mechanisms, such as electric meters, are supported by means of jewels and balls or pivots. The jewel bearings of indicating, recording and integrating meters are subject to wear and are extremely delicate so that they often roughen or break. In this condition they increase the friction load of the meter, resutling in low indication or registration.

In such meters which are used for billing purposes by public utilities errors, due to damaged bearings, may result in large losses of revenue. These bearings, although expensive and costly to replace, therefore, must be more frequently inspected and renewed than otherwise. Furthermore, operations of jewel and pivot bearings under conditions of vibration or shock, for example on war ships subjected to the effects of gunfire, actually destroys such bearings or causes excessive deterioration which greatly reduces their life.

It is an object of my invention to provide a magnetic suspension in place of the mechanically-supported bearings heretofore used for rotors or moving elements. This magntic bearing may take the form of two magnetized pieces of metal with like poles located adjacent each other. Or the bearing may take the form of two electro-magnets with like poles located adjacent each other. Or one piece of magnetized metal and one electromagnet may be used. One of the magnets is located on the moving element and the other located on a stationary part of the meter.

For a further exposition of my invention, reference may be had to the annexed drawing and specification at the end of which my invention will be specifically pointed out and claimed.

In the drawing (showing a watthour meter as an example):

Figs. 1, 2 and 3 are fragmentary, diagrammatic views of a portion of a watthour meter as seen in elevation, side view and plan, respectively, with parts broken away.

Fig. 4 is a fragmentary, diagrammatic view on an enlarged scale with parts in vertical cross-section.

Fig. 5 is a view in elevation to a reduced scale of a portion of a modified form of meter rotor.

Fig. 6 is a view in elevation to an increased scale with parts in vertical cross-section of a portion of a second modified form of meter rotor.

Fig. 7 is a perspective view of a modified form of magnet.

Fig. 8 is a vertical cross-section of a detail of yet another modified form of magnet.

Figs. 9, 10 and 11 are side elevations with parts in vertical cross-section of still other modifications.

In that embodiment of the invention chosen from among others for illustration in the drawing and description in the specification, the rotating element of a watthour meter consists of the customary disk 1 of aluminum or other suitable metal. The shaft which supports the disk is in this case formed in part by a cylindrical piece of permanently magnetized metal 2. For this purpose I have found high magnetic strength alloys to be entirely suitable. Magnet 2 forms part of the customary meter shaft 3. The rotor of the watthour meter is mounted so as to be supported by a second cylindrical piece of permanently magnetized metal 4. Elements 2 and 4 are thus permanent magnets and have their like poles placed adjacent each other so as to repel each other and thus float the rotor with a motion-limiting upper stationary part 6.

Stationary magnet 4 is supported by a flange or base plate 9 on which is located a block 5 having two projections 10 extending forward therefrom. Projections 10 serve as supports for the customary meter magnets which have been omitted for the sake of clarity. Mounted on block 5 is a yoke or bridge 7 which may be of non-magnetic material. Bridge 7 is of inverted U-shape as seen in elevation in Fig. 1. As seen in side view in Fig. 2, bridge 7 has slots 11 in its side walls which receive screws 12 for the purpose of adjustably supporting bridge 7 on block 5. The upper portion of bridge 7 extends into the space between magnets 2 and 4 and has a hole therein. The bridge may be dispensed with and the hole placed in the face of either magnet 2 or 4. Into this hole extends a pin 8 forming a part of either magnet 2 or magnet 4 and serving to center the meter rotor. A screw 13 serves to adjustably secure magnet 4 on block 5.

Fig. 5 shows a modification consisting of a watthour meter rotor having a disk 1 and an electromagnet 22 forming a part of the customary meter shaft 3. Current is conducted to electromagnet 22 by means of brushes 23 and slip rings 14 and 15 or the magnetic core magnetized by a cylindrical electromagnet fixed in position. The electromagnet 22 has a centering pin 8 at its lower end. It need hardly be repeated that either or both magnets 2 and 4 may be permanently magnetized pieces or metal or may be either alternating or direct current or undulating current electromagnets.

Fig. 6 shows that the opposite faces of the magnets may be of other shape than the flat faces shown in Figs. 1-5. In this case, disk 1 is carried by magnet 2 and has its lower end 16 formed hemispherical with a hemispherical depression 17 in magnet 4.

In Fig. 9 the magnet 2 is shown as having the centering pin 8 extending into a cylindrical opening 24 in the fixed magnet 4.

Either or both of the magnets may be provided with a magnetic shield of soft iron or alloy of low reluctance to provide a low reluctance path for the magnetic flux and thus minimize the influence of the magnet upon adjacent objects or the effects of extraneous influences upon the magnetic assembly. As shown in Fig. 7, a soft iron shield 18 partly encloses the magnet 4, leaving the upper pole of said magnet exposed for a distance sufficient to prevent an appreciable weakening of the magnetic strength at the pole face.

In the modification of Fig. 8, I have shown a magnet 40 which supports, by magnetic repulsion, a second magnet 20. The magnets 20 and 40 are plated, respectively, with copper or other non-magnetic metal sheaths 220 and 221 to protect the magnets from loss of magnetism due to contact of the magnetic surface with other magnetic materials or with each other. Sheaths 220 and 221 also provide a bypass for transient currents from outside sources which might otherwise pass through the magnet. The magnetic shields 18 and 180 confine the magnetism to the vicinity of the exposed poles.

Although the entire disk 1 has been represented as being flat, it may be other than flat, as for example cupped upwardly at the center as shown in Fig. 10. In this modification, the annular disk 100 forms the brim of an inverted cylindrical cup 26, concentrically attached to the rotatable magnet 2. This construction has the advantage of greatly increasing the stability of the system by lowering the center of gravity of the rotatable assembly below the point of support. Also, the opening 28 provides an enclosure for preventing accumulation of dust or other foreign matter in the space between the magnets. As further represented in this modification, the face of the magnet 2 is a truncated cone with a corresponding truncated conical opening in the face of the magnet 4. In this construction the centering thrusts or repulsions of the conical surfaces permit normal operation when the device is out of level or when the rotating element is subjected to unbalanced forces.

In Fig. 11, I have shown the shaft 3 passing through the air core of a fixed solenoid 30. Attached to and forming part of the shaft 3 within the solenoid 30 is a section 32 of magnetic metal. Below the solenoid the shaft is centered by a fixed ball-bearing 34. When the solenoid 30 is energized through leads 38, the entire moving element will be supported by the electromagnetic interaction of section 32, with the solenoid. A fixed stop 36 is provided to support the moving element when the solenoid is not energized. It is understood that the solenoid may be energized with alternating or direct current and that the section 32 may be of greater or less diameter than the shaft 3 and may be a permanent magnet or made of solid or laminated soft iron or other magnetic metal or alloy. Although the bearing 34 has been described as a ball-bearing it may be a sleeve, roller or other type bearing. If desired, a bearing may be used above the solenoid as well as or in place of below the solenoid.

It is readily understood that my invention is equally applicable as a thrust bearing for limiting axial movement of a movable element mounted in any position.

I do not intend to be limited save as the scope of the appended claims may require.

I claim:

1. In a device having a movable element, a bearing for said element comprising, a magnet forming a part of said moving element, and a second magnet mounted on a stationary part of said device, said magnets being mounted with their like poles adjacent so that said moving element is supported by the repulsion between said magnets, at least one of said magnets having mounted thereon in non-rotative relation thereto a magnetic shield of low-reluctance material to provide a low-reluctance path for the magnetic flux.

2. The combination according to claim 1 in which said shield leaves at least one of the poles of said magnet exposed for a distance sufficient to prevent an appreciable weakening of the magnetic strength at the pole face.

3. In a device having a moving element, a bearing for said element comprising a permanent magnet forming a part of said moving element, and a second permanent magnet mounted with their like poles adjacent so that said moving element is supported by the repulsion between said magnets, each of said magnets having on a portion of its outer surface a sheath of non-magnetic metal to prevent loss of magnetism due to contact of the magnet surfaces with each other or with other magnetic material.

WALTER C. WAGNER.